US006858840B2

(12) United States Patent
Berkout et al.

(10) Patent No.: US 6,858,840 B2
(45) Date of Patent: Feb. 22, 2005

(54) METHOD OF ION FRAGMENTATION IN A MULTIPOLE ION GUIDE OF A TANDEM MASS SPECTROMETER

(75) Inventors: Vadym D. Berkout, Rockville, MD (US); Vladimir M. Doroshenko, Ellicott City, MD (US)

(73) Assignee: Science & Engineering Services, Inc., Columbia, MD (US)

( * ) Notice: Subject to any disclaimer, the term of this patent is extended or adjusted under 35 U.S.C. 154(b) by 0 days.

(21) Appl. No.: 10/441,004

(22) Filed: May 20, 2003

(65) Prior Publication Data

US 2004/0232324 A1 Nov. 25, 2004

(51) Int. Cl.$^7$ .......................... H01J 49/00; B01D 59/44

(52) U.S. Cl. ........................ 250/282; 250/283; 250/281

(58) Field of Search ................................ 250/281, 282, 250/283, 292

(56) References Cited

U.S. PATENT DOCUMENTS 4,731,533 A * 3/1988 Vestal ........................ 250/292
6,285,027 B1 9/2001 Chernushevich et al.
2002/0092980 A1 * 7/2002 Park ........................... 250/288
2002/0175280 A1 11/2002 Franzen

FOREIGN PATENT DOCUMENTS

WO WO 03/103007 * 11/2003 ................. 250/281

OTHER PUBLICATIONS

Howard R. Morris et al, High Sensitivity Collisionally–activated Decomposition Tandem Mass Spectrometry on a Novel Quadrupole/Orthogonal–acceleration Time–of–flight Mass Spectrometer, Rapid Commun. Mass Spectrometry, 1996, vol. 10, pp. 889–896.

Andrej Shevchenko et al., Rapid 'de Novo' Peptide Sequencing by a Combination of Nanoelectrospray, Isotopic Labeling and A Quadrupole/Time–of–flight Mass Spectrometer, Rapid Commun. Mass Spectrometry, 1997, vol. 11, pp. 1015–1024.

Roman A. Zubarev et al., Electron Capture Dissociation of Multiply Charged Protein Cations. A Nonergodic Process, J. Am. Chem. Society, 1998, vol. 120, pp. 3265–3266.

Frank Kjeldsen et al., Dissociative Capture of Hot (3–13 eV) Electrons by Polypeptide Polycations: an efficient process accompanied by secondary fragmentation, Chemical Physics Letters. 2002, vol. 356; pp. 201–206.

* cited by examiner

*Primary Examiner*—John R. Lee
*Assistant Examiner*—James J. Leybourne
(74) *Attorney, Agent, or Firm*—Oblon, Spivak, McClelland, Maier & Neustadt, P.C.

(57) ABSTRACT

A system and method for mass analysis of an ion beam. The system includes a mass selector, at least one multipole ion guide, and a mass analyzer. In the system and method, precursor ions are selected with a desired mass to charge ratio. Electrons are injected into the multipole ion guide. The precursor ions are fragmented into product ions via electron capture dissociation from the injected electrons. The product ions are passed to a mass analyzer for a mass analysis.

54 Claims, 11 Drawing Sheets

METHOD OF ION FRAGMENTATION IN A MULTIPOLE ION GUIDE OF A TANDEM MASS SPECTROMETER

DISCUSSION OF THE BACKGROUND

1. Field of the Invention

The invention relates to procedures and devices for fragmenting molecular ions, preferably biomolecular ions in tandem mass spectrometers.

2. Background of the Invention

Over the last decade, mass spectrometry has played an increasingly important role in the identification and characterization of biochemical compounds in research laboratories and various industries. The speed, specificity, and sensitivity of mass spectrometry make spectrometers especially attractive for requiring rapid identification and characterization of biochemical compounds. Mass spectrometric configurations are distinguished by the methods and techniques utilized for ionization and separation of the analyte molecules. The mass separation process can include techniques for ion isolation, subsequent molecular fragmentation, and mass analysis of the fragment ions. The pattern of fragmentation yields information about the structure of the analyte molecules introduced into the mass spectrometer. Increased fragmentation thus increases one's ability to distinguish one mass group from another mass group.

Indeed, ion isolation, molecular fragmentation, and mass analysis have been combined in a technique referred to as tandem mass spectrometry (or MS/MS) to thereby enhance identification of ion species. Tandem mass spectroscopy typically coupled with electrospray ionization (ESI) is a known technique utilized to produce gas phase ions of bio- and chemical molecules. Indeed, ESI is a soft ionization technique which produces multiply-charged molecular ions of large biomolecules. ESI continuously produces ions at normal atmospheric conditions. Once produced, the ions are introduced into a vacuum of a mass spectrometer using an atmospheric pressure interface. Liquid separation techniques such as for example high pressure liquid chromatography (HPLC), charge exchange (CE) generating radical ions of low internal energy, and on-line electrospray ionization mass spectrometry have all contributed to the success of modern biochemistry, pharmacology and health sciences. Even with these advances, the distinction of one large biomolecule from another depends on unique fragmentation patterns characteristic of the particular chemical bonding of the specific biomolecule.

Furthermore, the tandem mass spectrometer concept has been extended to triple quadrupole mass spectrometers. Triple quadrupole mass spectrometers have also been interfaced to electrospray ion sources. Triple quadrupole mass spectrometers offer medium resolution (up to several thousands Da) and low mass range (up to 2000–3000 Da) for MS/MS analysis. Further, systems known as QqTOF (or Q-TOF) combine two quadrupole mass sectors with time-of-flight mass analyzers (TOFMS). QqTOF techniques have been described for example by Morris et al, Rapid Commun. Mass Spectrometry, 1996, 10:889–896, and by Shevchenko et al, Rapid Commun. Mass Spectrom. 1997, 11:1015–1024, the entire contents of which are incorporated herein by reference. The QqTOF configuration can be considered as a replacement of the third quadrupole in a triple quadrupole instrument by a time-of-flight mass analyzer. The benefits of the QqTOF system are high sensitivity, mass resolution and mass accuracy in both precursor (MS) and product ion (MS/MS) modes. A particular advantage for full-scan sensitivity (over a wide mass range) is provided in both modes by the parallel detection feature available in TOF MS.

Fragmentation of ions is achieved in commercial tandem mass spectrometers through collisionally induced dissociation (CID) with buffer gas molecules in a quadrupole collision cell, see for example U.S. Pat. No. 6,285,027, the entire contents of which are incorporated herein by reference. In collisionally induced dissociation or fragmentation, the energy of collision is quickly redistributed over the large number of vibrational degrees of freedom available in large biomolecules. The energy redistribution leads to dissociation of bonds only of the lowest activation energy. Thus, the CID method seldomly provides sufficient MS/MS sequence information for proteins larger than 2 kDa. Since the excitation in CID is not specific, the most labile bonds are typically cleaved (which are often a modifying group) and not necessarily the structurally important bonds. Furthermore, CID requires the presence of the buffer gas at pressures of the order of 10 mTorr or more. Because the subsequent mass analyzer needs a relatively high vacuum for its operation, restricting apertures are introduced between the last fragmenting quadrupole and a second mass analyzer, thus reducing the number of ions transmitted and the overall sensitivity.

Electron capture dissociation (ECD) is a recent fragmentation technique that utilizes an ion-electron recombination reaction, as described by Zubarev et al, J. Am. Chem. Soc. 1998, 120: 3265–3266, the entire contents of which are incorporated herein by reference. The maximum cross section for the ion-electron recombination reaction occurs at very low electron energies (e.g., lower than 0.5 eV) and exceeds the collision cross section with neutral species by about 100 times. To date, ECD has been implemented in ion cyclotron resonance Fourier transform mass spectrometers (ICR-FTMS) with electrons injected directly into ICR cell only. Almost all ECD fragment ions come from a single bond cleavage. This makes electron capture dissociation well suited for protein sequencing. In contrast to CID, ECD is believed to be non-ergodic, i.e., the cleavage happens prior to any intramolecular energy redistribution. As a result, the ECD method cleaves more bonds than a conventional CID technique. Almost all known proteins in vivo contain post-translational modifications, which modulate and often define their biological function. Determination of the sites of these modifications is a top priority in proteomics studies. However, fragmentation using for example low-energy CID has the drawback of fragmenting the most labile bonds at the highest rate, which often are the linker bonds to the modifications. As a result, a modification group is often lost prior to the backbone fragmentation, making it difficult or impossible to determine a prior location of the modification group. In contrast, ECD cleaves specifically N—$C_\alpha$ bonds and imparts only a minimum of the internal energy into the fragments. The latter species, especially the even-electron c ions, i.e. one classification of fragmented peptides, retain the modification groups making their localization straightforward.

Recently, another type of ECD method referred to as "hot" electron capture dissociation (HECD) has been reported by Kjeldsen et al, *Chem. Phys. Lett.* 2002, 356: 201–206, the entire contents of which are incorporated herein by reference. Besides having a known maximum of electron capture dissociation (ECD) of gas-phase polypeptide polycations at low electron energy, a broad local maximum is found around 10 eV. The existence of this 10 eV maximum can be attributed to an electronic excitation prior to electron capture, a phenomenon similar to that in the dissociative recombination of small cations. In the HECD regime, not only N—$C_\alpha$ bonds are cleaved as in ECD, but secondary fragmentation is also induced due to the excess energy. Beneficially, this fragmentation includes abundant losses of, for example, $CH(CH_3)_2$ from Leucine and $CH_2CH_3$ from Isoleucine residues terminal to the cleavage site, which allows for distinguishing between these two isomeric residues. Even for larger molecules, the HECD produces abundant secondary fragmentation, despite the presence of substantially more degrees of freedom over which the excess energy could be distributed.

ECD/HECD ion fragmentation of biological molecules has been made in an ion cyclotron resonance Fourier transform mass spectrometer (ICR-FTMS) having electrons injected directly into the ICR cell. U.S. Patent Publication Application No. 2002/0175280, the entire contents of which are incorporated herein by reference, describes the use of electron capture dissociation for ion fragmentation in a three-dimensional ion trap. Since an electric potential inside the ion trap including the central point is time dependent, the electron source is kept at the highest positive potential achieved at the center of the ion trap during the RF cycle. Electrons can reach the ions stored inside the ion trap only during a period of few nanoseconds (or 0.1% of oscillation cycle) when the electric field potential at the center of the ion trap is close to the electron source potential. Together with a small size of aperture for electron beam introduction, this makes the effectiveness of ECD in this arrangement low.

Thus, to date, mass analyzers have not optimized electron capture dissociation to provide improved fragmentation and cleavage of input ionized species.

SUMMARY OF THE INVENTION

One object of the present invention is to inject electrons inside multipole ion guides in a mass analyzer sector such that injected electrons can interact with the input ionized species to more fully dissociate the ionized species.

A further object of the present invention is to supplement the dissociation by providing a buffer gas in the region of interaction of the ionized species.

Yet, another object of the present invention is to promote fragmentation via electron capture dissociation via interactions of the injected electrons with the ions present in the mass analyzer sector. As such, according to the present invention, improvements in tandem mass spectrometry capability are realized. Some of the advantages can include: (i) an increase of the mass range for tandem MS analysis; (ii) a simplification of the peptide sequencing process; (iii) a more reliable determination of posttranslational modifications, (iv) resolving the ambiguity arising from Leucine/Isoleucine isobars, and (v) high mass assignment accuracy for fragment ions.

In accordance with the present invention, there is provided a system and method for mass analysis on an ion beam. The system includes a mass selector (although optional in some of the embodiments of the present invention), at least one multipole ion guide, and a mass analyzer. In the present invention, ions are passed through a mass selector to select precursor ions with a desired mass to charge ratio, electrons are injected into the at least one multipole ion guide, the precursor ions are fragmented into product ions inside the multipole ion guide via electron capture dissociation from the injected electrons. The product ions are passed into a mass analyzer for mass analysis/detection.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein:

FIGS. 4B-1 and 4B-2 are schematic illustrations depicting the RF waveforms and corresponding potentials of the present invention for an emitting surface of the electron source for one embodiment of the present invention;

DETAILED DESCRIPTION OF THE PREFERRED EMBODIMENTS

Figure 1:
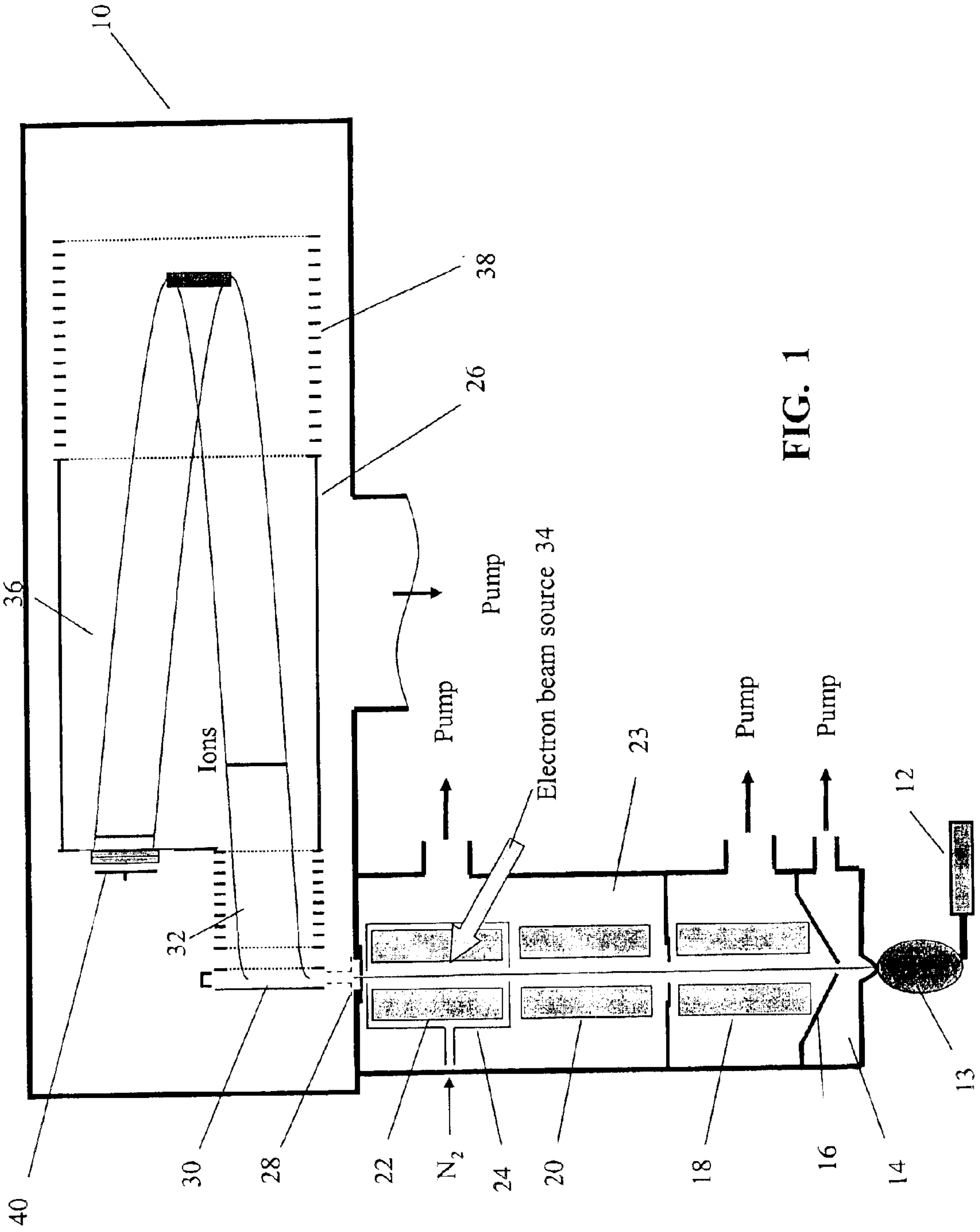
FIG. 1 is a schematic of a QqTOF instrument for one embodiment of the present invention.

Referring now to the drawings, wherein like reference numerals designate identical, or corresponding parts throughout the several views, FIG. 1 is a schematic for a preferred embodiment of a QqTOF instrument 10 of the present invention.

Conventional QqTOF tandem mass spectrometers have been used to improve mass accuracy, mass resolution and sensitivity. For example, U.S. Pat. Nos. 6,285,027 and 6,504,148, the entire contents of which are incorporated herein by reference, describe hybrid MS/MS instruments such as QqTOF instruments in which the final stage of mass analysis (MS2) is accomplished via a non-scanning time-of-flight (TOF) mass spectrometer. The hybrid MS/MS instruments have a duty cycle advantage over traditional MS/MS instruments in that the TOF section in the QqTOF instruments is not a scanning mass spectrometer, and all of the ions in the product ion mode are collected within a few hundred microseconds. These instruments are typically 10–100 times more sensitive than conventional instruments in the product ion scan mode of operation.

The QqTOF instrument 10 of the present invention includes an ion source 12 such as for example an electrospray source. Other suitable ion sources can be utilized, according to the present invention. Ions generated in the electrospray source 12 form a plume 13 from which ions are collected into a differentially pumped region 14, maintained at a pressure of for example a few Torr. The ions are then collected through a skimmer 16 and pass into a first collimating quadrupole 18 operated in RF-only mode. Quadrupole 18 can be operated, for example, at a pressure around $10^{-2}$ Torr. Downstream, another chamber 23 includes two main rod sets for quadrupoles 20 and 22. In this embodiment, the downstream chamber 23 is maintained preferably at a relatively low pressure, for example of approximately $10^{-5}$ Torr. The rod set for quadrupole 20 can be operated in a mass resolving mode to select ions with a particular m/z ratio. Selected ions then pass from quadrupole 20 into quadrupole 22 where, according to one embodiment of the present invention, the selected ions are subjected to electron capture dissociation (ECD). A housing 24 around quadrupole 22 allows optionally the addition of a buffer gas, for example, at pressures $10^{-3}$–$10^{-2}$ Torr. The buffer gas promotes collisional focusing of product ions. Energy losses to the buffer gas reduces the energy of the ions inside quadrupole 22 allowing the ions, now having a lower energy, to accumulate (i.e., be focused) to the center of the quadrupole. Then, product ions and any remaining precursor ions enter an analyzer such as for example the TOF mass analyzer 26 depicted in FIG. 1. Electron capture dissociation can be facilitated according to the present invention by either introducing electrons into the region between quadrupoles 20 and 22 or by injecting electrons inside quadrupole 22.

As the ions leave quadrupole rod set quadrupole 22, the ions pass through ion focusing optics 28. A near parallel ion beam continuously enters an ion storage area 30 of an accelerator 32. Initially, the ion storage area 30 is field-free, so ions continue to move in their original direction. When a pulsed electric field is applied across the ion storage area 30, ions are deflected in a direction orthogonal to the original trajectory into an accelerating column. Ions exiting the accelerator 32 pass a field-free drift region 36 and then are reflected back in the ion mirror 38. After passing one more time through the field-free drift region 36, the ions strike a detector 40.

Figure 2A:
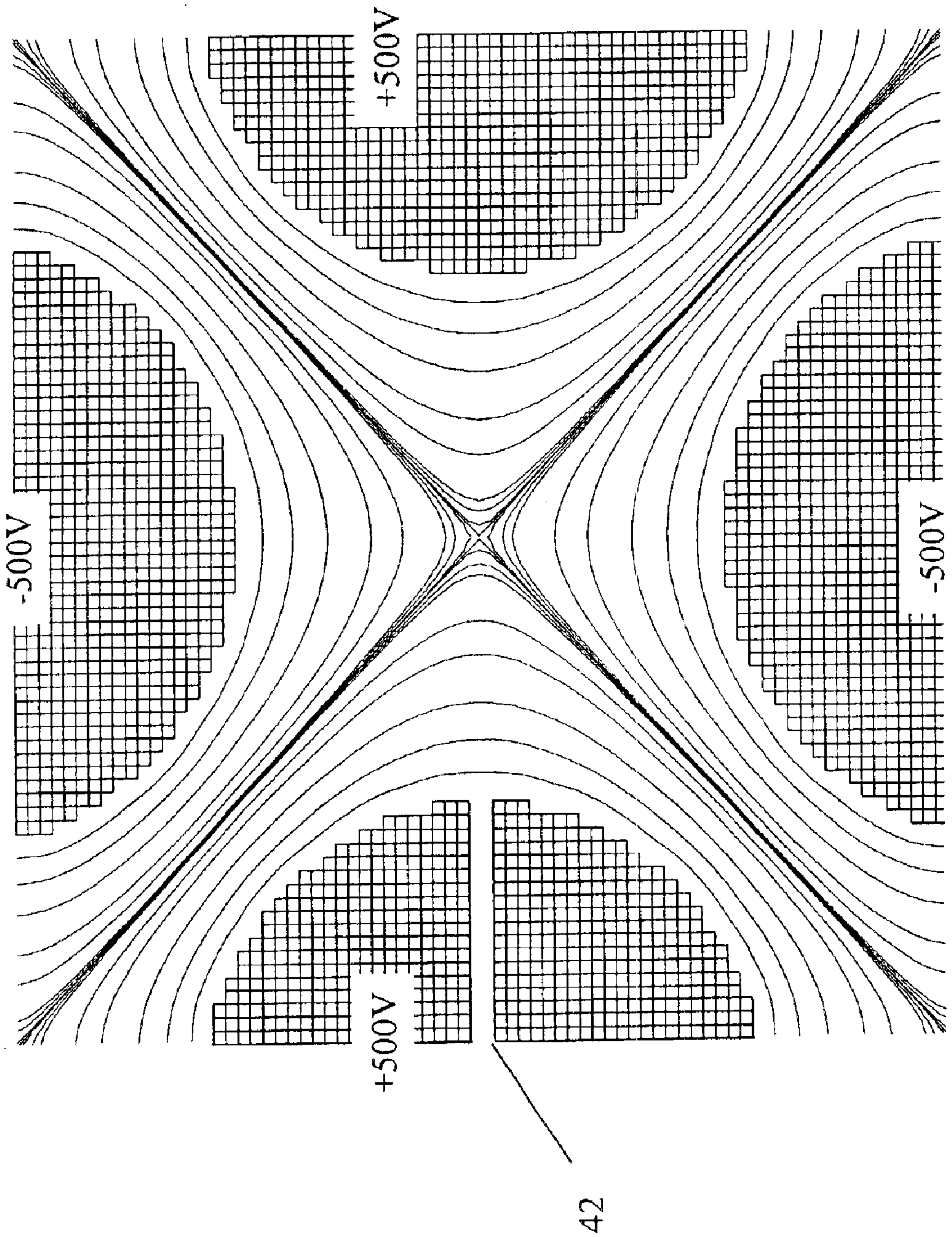
FIGS. 2A, 2B, and 2C are schematic illustrations depicting electric potential distributions inside a circular shaped quadrupole ion guide at different times, showing equipotential lines correspond (starting from the central axis) to 0, +/−1, +/−5, +/−10, +/−50, +/−100, +/−200, +/−300, +/−400 V, respectively.
Figure 2B:
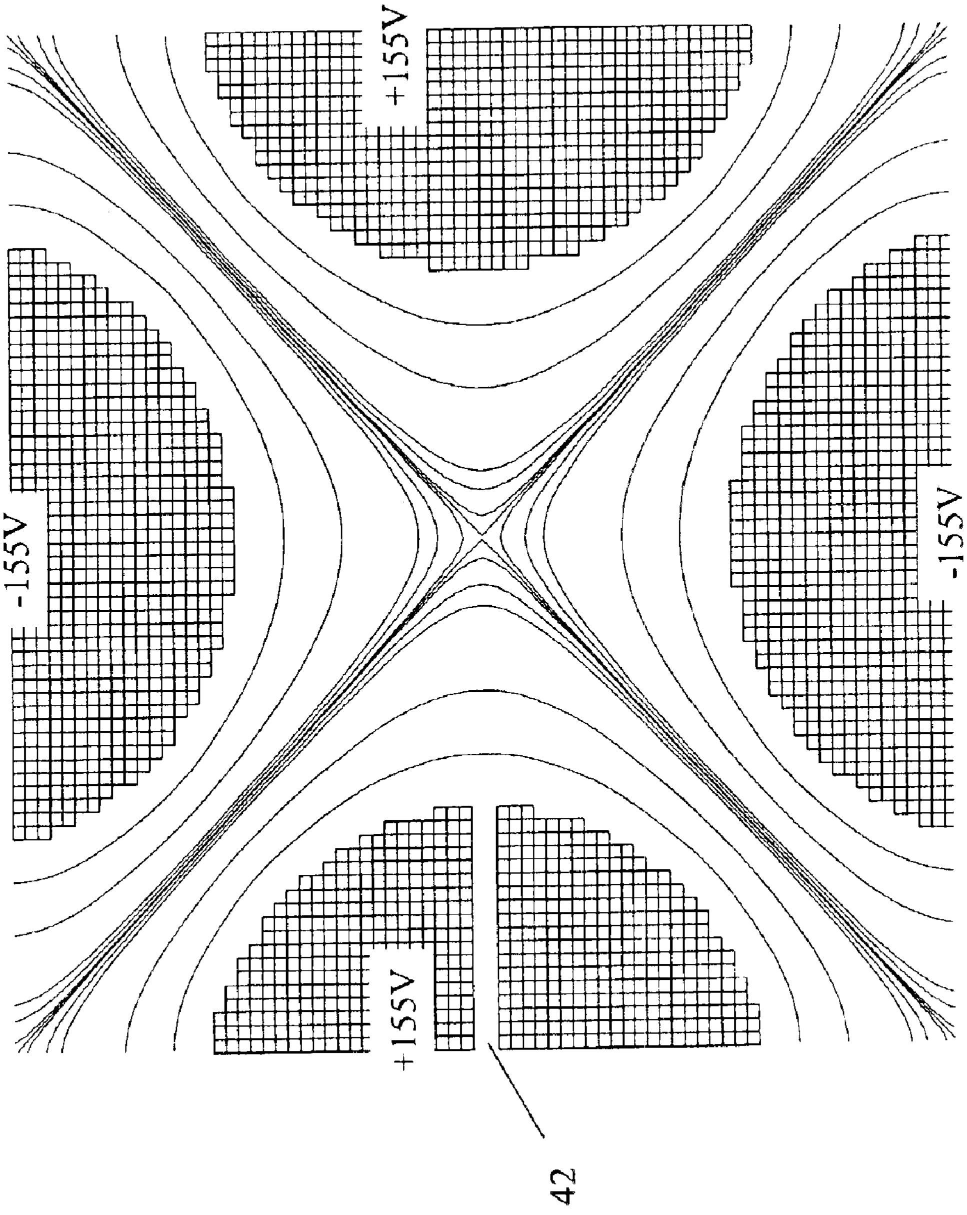
Figure 2C:
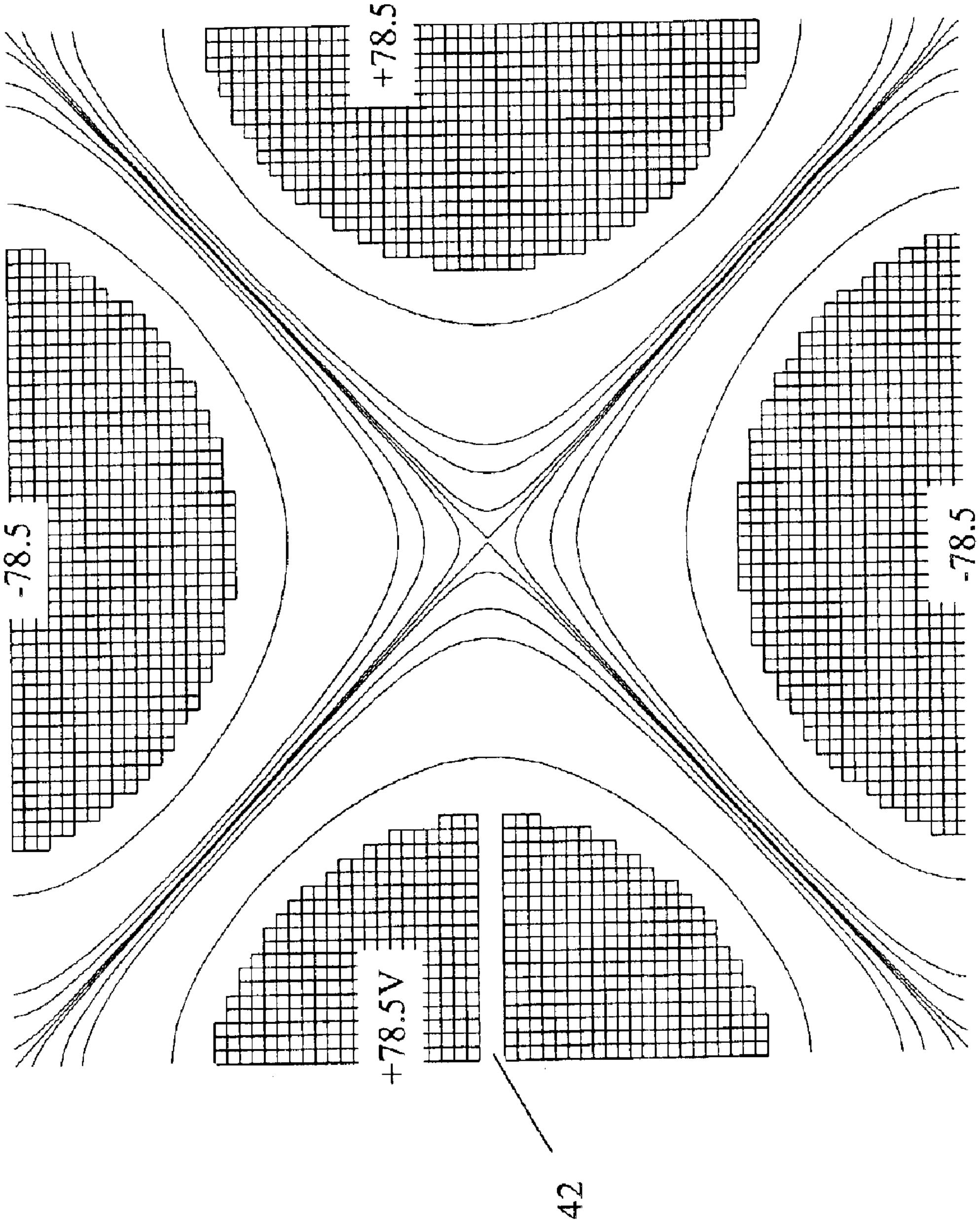

In one embodiment of the present invention, electrons are injected from an electron source 34 into a quadrupole ion guide through a slit 42 in one of the quadruple rods, as shown in FIGS. 2A, 2B, and 2C. Injected electrons, according to the present invention, arrive at a central region of the quadruple ion guide with an energy appropriate for ECD or HECD. These energies depend on the lowest unoccupied orbital energies of the specific ionic species being fragmented. For electron capture dissociation of multiply charged peptide ions, these energies lie typically in the range 0.0–0.5 eV for low energy ECD and typically in the range of 3–13 eV for hot energy ECD. Such ranges, while derived from an electron interaction with multiply charged peptide ions, provide an estimated range for other molecules such as for example large biomolecules, whose fragmentation and identification constitute one aspect of the present invention. Moreover, any electron beam source which produces electrons with an energy distribution of a few tenths of eV is applicable to the present invention. Further, electron injections of electron beams inside the quadrupole ion guide with energies around 0 eV at the axis are also appropriate, according to the present invention, for low energy electron capture dissociation.

The potential distribution inside the ion guide, as calculated by SIMION 7.0 software at different times, is shown in FIGS. 2A, 2B, and 2C. SIMION 7.0 software is a commercially available software package from Scientific Instrument Services, Inc., 1027 Old York Rd., Ringoes, N.J. 08551. The presence of the slit 42 in the quadrupole rod does not significantly disturb the electrical field in the central part of the quadrupole ion guide. If a positive voltage, relative to the electron-emitting surface, is applied to this rod, electrons first will be accelerated and then decelerated, due to the electrons first encountering a positive electric field potential which reduces in potential the closer to the center of the ion guide. FIGS. 2A, 2B, and 2C show that, when the amplitude of the RF voltage decreases from a maximum of 500 V to 78.5 V, an area with a potential of less than 1 V occupies approximately 10% of the space between quadrupole rods on the central axis. If an electron-emitting surface has an electric potential close to the ground potential, the energy of electrons in this area with a potential of less than 1 V is less than 1 eV. A collisionally focused ion beam is located approximately in this area, see for example Douglas et al, J. B. *J. Am. Soc. Mass Spectrom.* 1992, 3: 398–408, the entire contents of which are incorporated herein by reference. As a result of the approximately same locations of the low energy electrons and the ion beams in the present invention, an effective electron capture dissociation occurs. According to one embodiment of the present invention, a time period favorable for ECD corresponds to approximately 1/10 of the RF period.

Electric field intensities inside the quadrupole ion guide $E_x$ and $E_y$ are described by following relations:

$$E_x = \frac{-2U_0\cos(\omega t+\varphi)}{r_0^2}x$$

$$E_y = \frac{2U_0\cos(\omega t+\varphi)}{r_0^2}y$$

where $U_0$ is an amplitude of the RF field, ω represents the frequency, Φ represents the phase, x,y represent the coordinates measured from the center, and $r_0$ represents the inscribed radius. These relations show that electrons deviating from the x axis, located at the center of the slit, will experience a force towards this axis, thus focusing the electron beam toward the ion guide center.

Figure 3A:
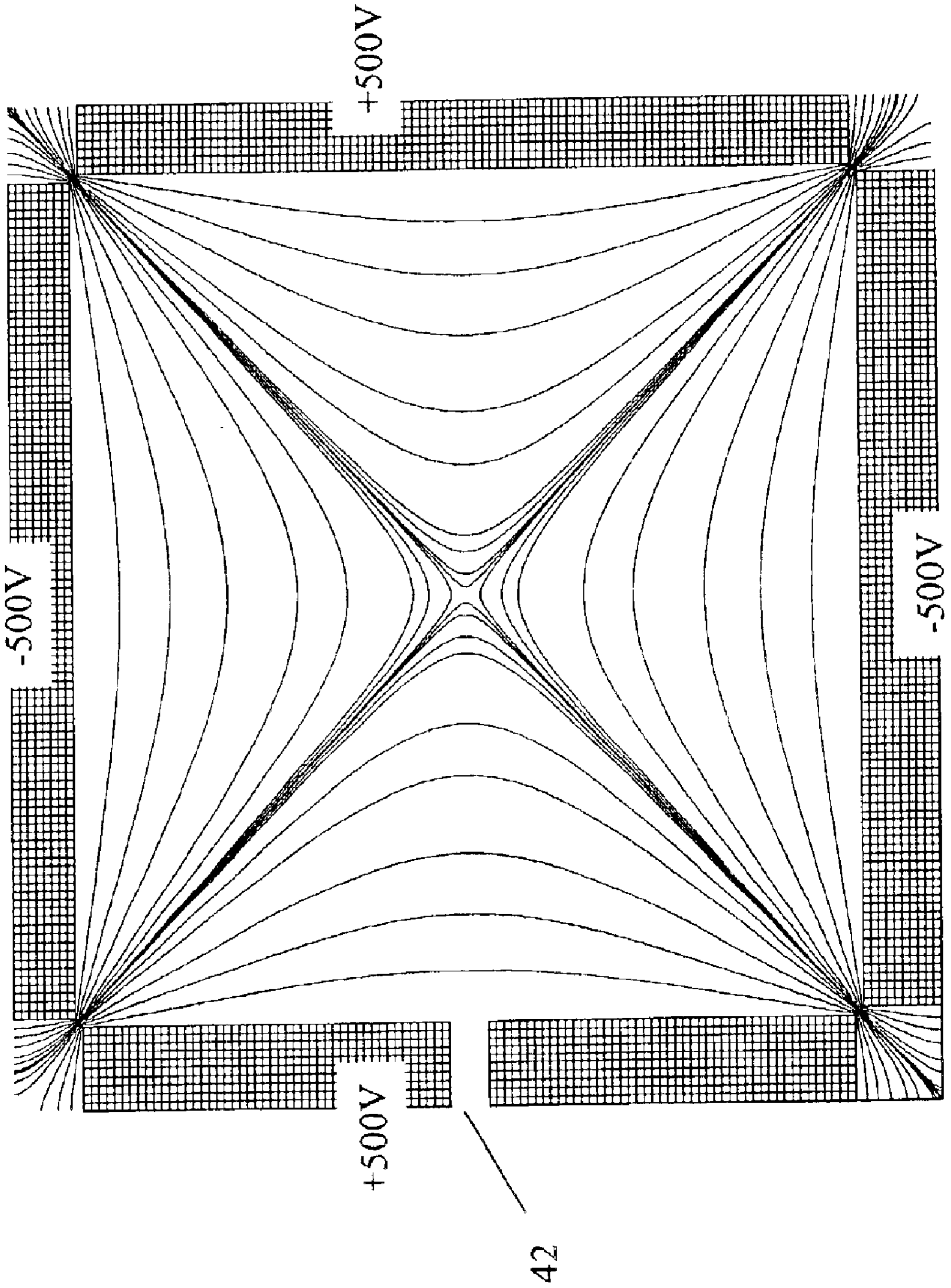
FIGS. 3A, 3B, and 3C are schematic illustrations depicting electric potential distributions inside a rectangular shaped quadrupole ion guide at different times, showing equipotential lines correspond (starting from the central axis) to 0, +/−1, +/−5, +/−10, +/−50, +/−100, +/−200, +/−300, +/−400 V, respectively.
Figure 3B:
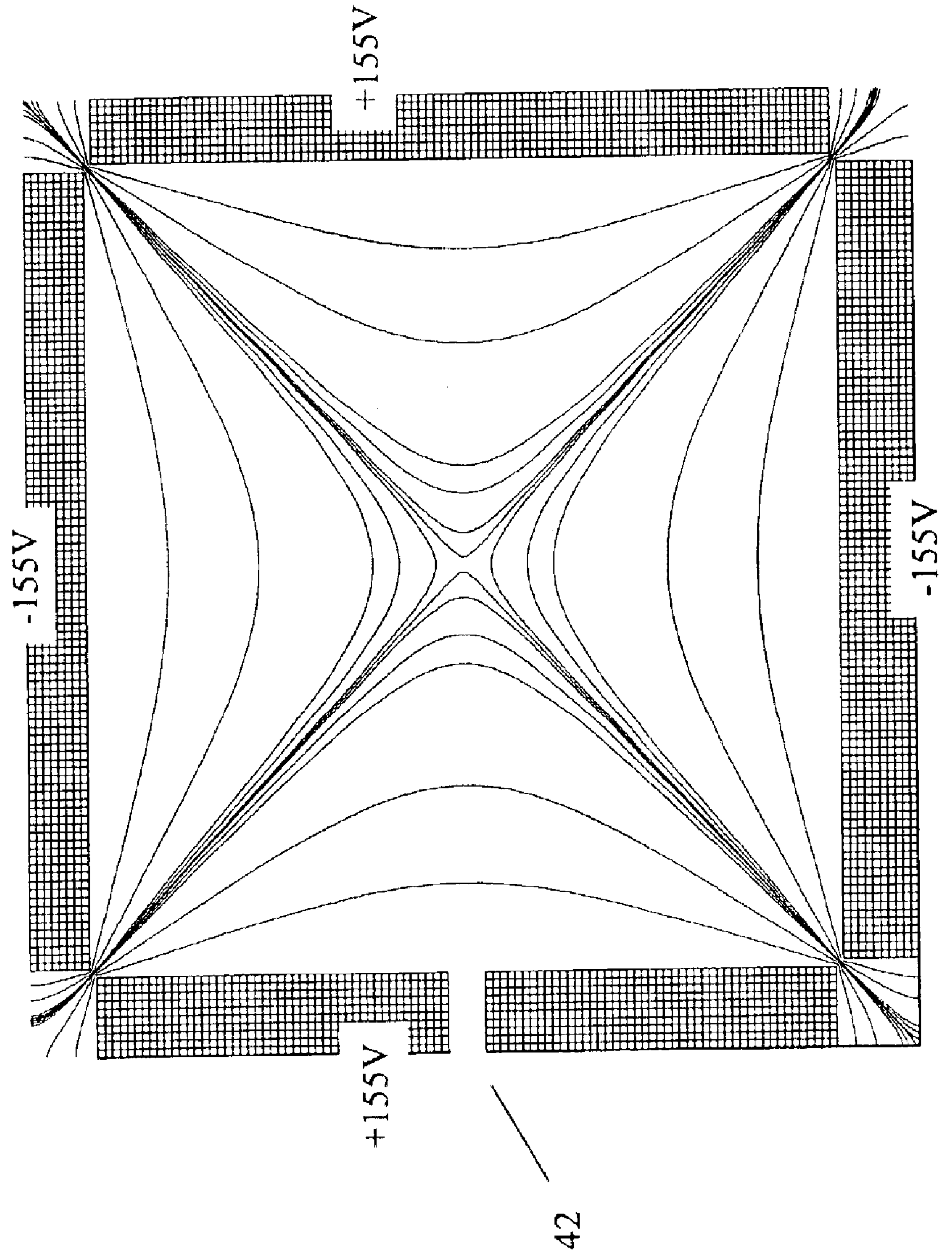
Figure 3C:
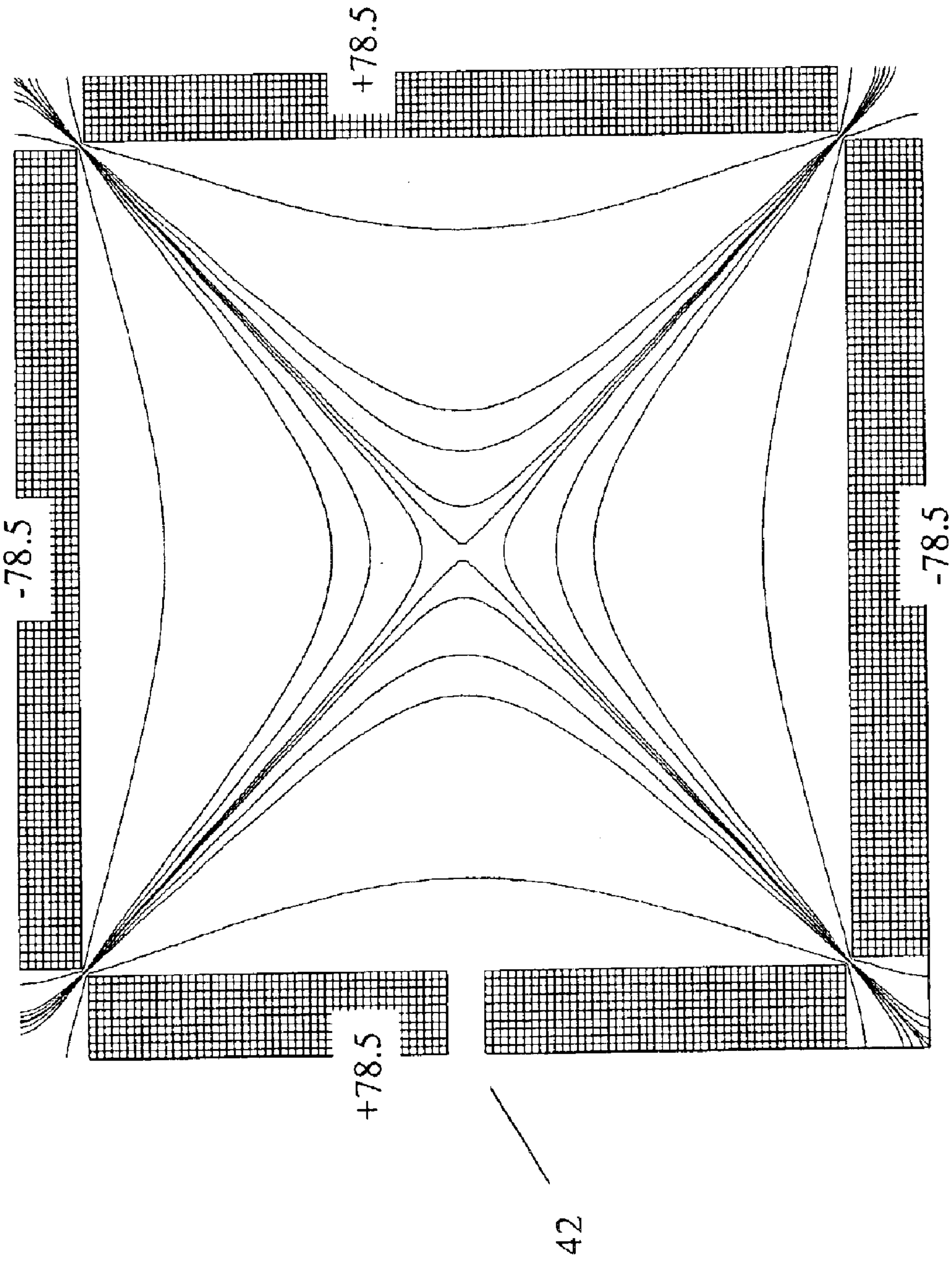

In one preferred embodiment of the present invention having a simplified mechanical design, an alternative configuration of the quadrupole rod set is used having rectangular shaped rods. Electric potentials for a rod set having rectangular shaped rods is shown in FIGS. 3A, 3B, and 3C. Despite the rectangular shaped rods, the potential distribution near the center of the ion guide resembles the distribution in the quadrupole rod set having round rods. Thus, similar collisional focusing of ions occurs towards the center according to the present invention. An effective electron capture dissociation with the rectangular rod set is realized, according to the present invention, during approximately 10% of the oscillation cycle. During the remaining part (~90%) of the oscillation cycle, the corresponding voltage applied to the electron focusing optics (depicted in FIG. 4A) will prevent the electron beam from entering the central part of the ion guide.

Figure 4A:
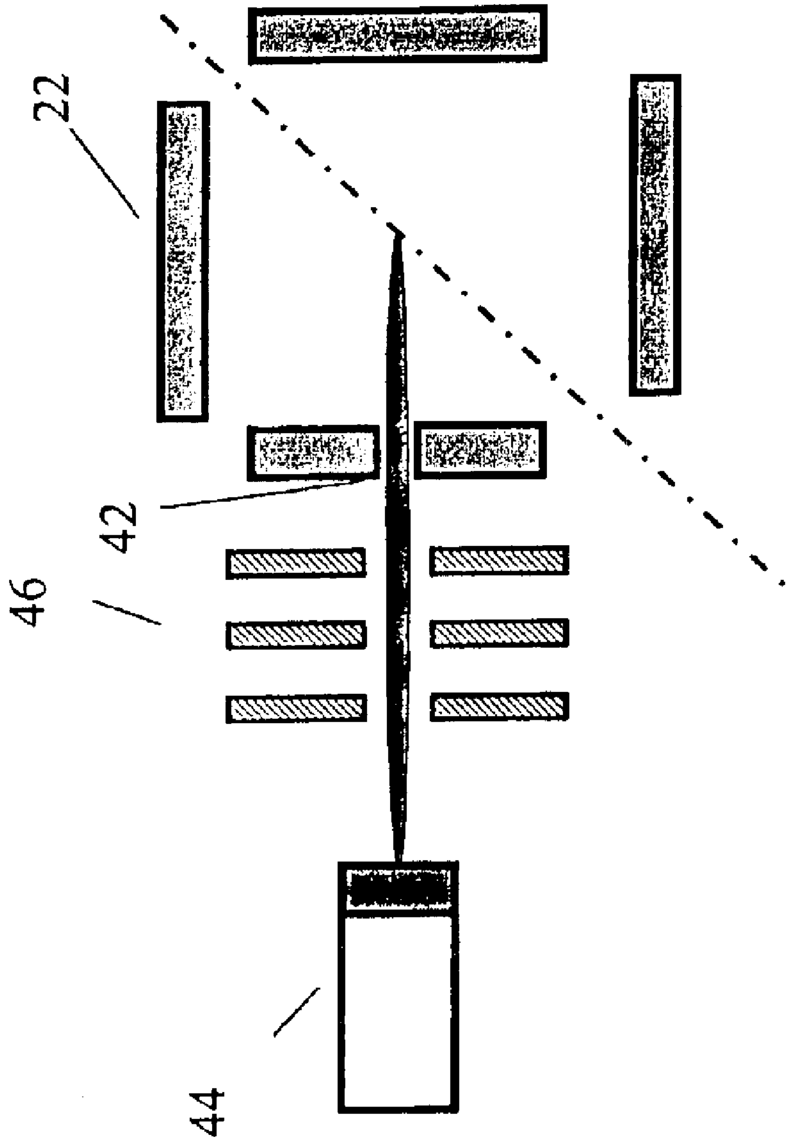
FIG. 4A is a schematic illustration showing one preferred embodiment of the present invention depicting an electron beam source for injecting electrons which interact with an ion stream.

FIG. 4A depicts an electron injector, which includes an electron beam source 44 and electron beam focusing optics 46, for injecting electrons which interact with an ion stream. The present invention can utilize any of a number of standard electron injections, including electron gun sources available on the commercial market for installation in vacuum equipment. Suitable electron gun sources and electron lens arrangements used to generate and collimate electron beams in the present invention can be similar to those described for example in U.S. Pat. Nos. 5,223,74 and 4,820,927 and 4,760,567, the entire contents of each patent are incorporated herein by reference. As shown in FIG. 4A, in one embodiment, the electrons are injected normal to the electrodes and through a slit in the electrodes. As depicted by the broken line on FIG. 4A, the electron injector can be configured to inject electrons obliquely through gaps between the electrodes. In this embodiment, electron injection is preferably synchronized with the below discussed zero-voltage windows of a square waveform applied to the electrodes of the multipole ion guide.

Decreasing the electric potential of the electron-emitting surface by approximately 10 V provides electrons to the center of the ion guide of an energy around 10 eV, thus allowing, according to the present invention, a switch to a "hot" electron capture dissociation (HECD) regime of ion fragmentation.

Figures 1, 4B:
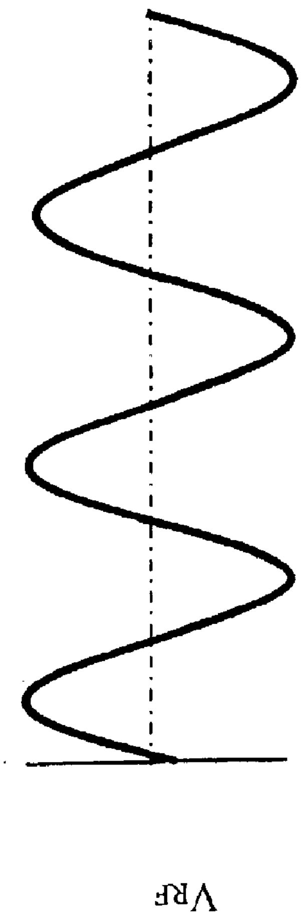
Figures 2, 4B:
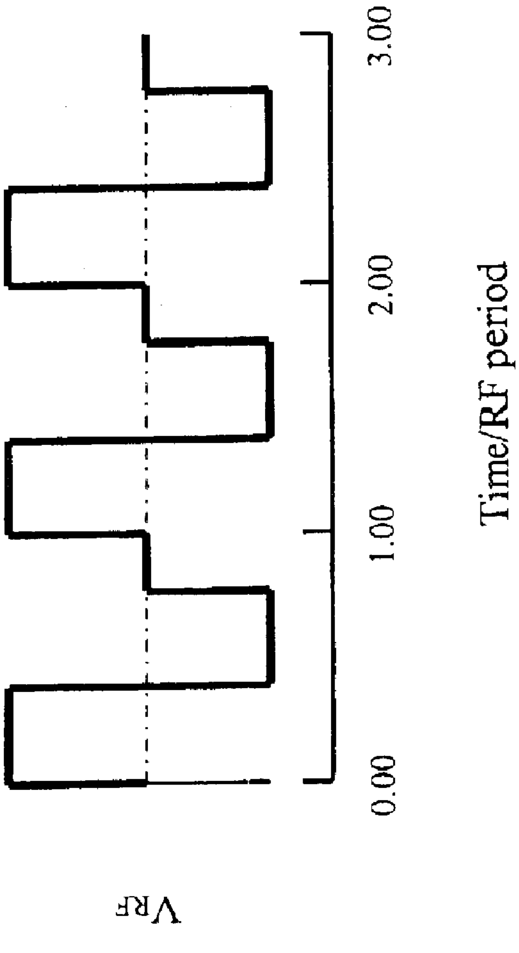

A regular sine RF waveform depicted in FIG. 4B-1 can be used to feed multipole ion guides. However, in this case, the sinusoidal time variance of the electrical field inside the ion guide limits the area where electrons have an energy close to 0 eV. Other approaches, according to the present invention, resolve the limited area of an energy close to 0 eV by utilizing a square waveform to drive the ion guide instead of a regular sine waveform RF voltage. Similar approaches have been described by Sudakov et al, *Eur. J. Mass Spectrom.* 2002, vol. 8: 191–199, the entire contents of which are incorporated herein by reference. The rectangular waveform shown in FIG. 4B-2 (bottom) provides "zero voltage windows" for the injection of electrons into the field-free trapping volume. In this case an electron beam could be introduced into the ion guide through an open space between rods, thus allowing the use of a more intense electron beam for electron capture dissociation.

Figure 5:
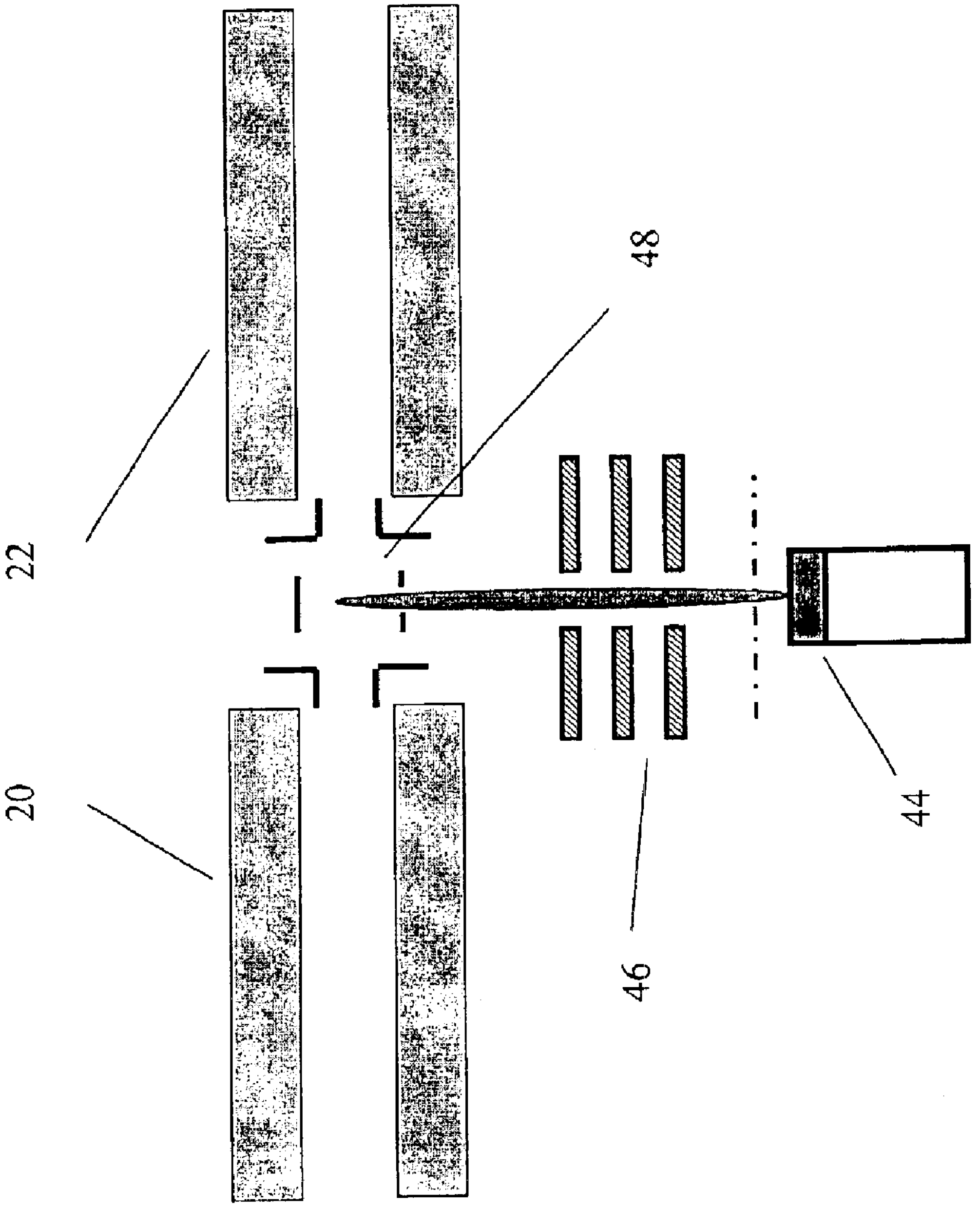
FIG. 5 is a schematic illustration showing an alternative embodiment of the present invention for conducting ECD dissociation.

A more elaborate mechanism for interacting an ion stream with electrons is depicted in FIG. 5. In this embodiment of the present invention, the Einsel lens arrangement, similar to those described in the aforementioned electron gun and electron source patents, results in only DC fields being present at the area where an electron beam is introduced. Further, as depicted in FIG. 5, electrons are injected into a region between quadrupole 20 and quadrupole 22 where ion focusing optics 48 direct ions from quadrupole 20 to quadrupole 22.

Figure 6:
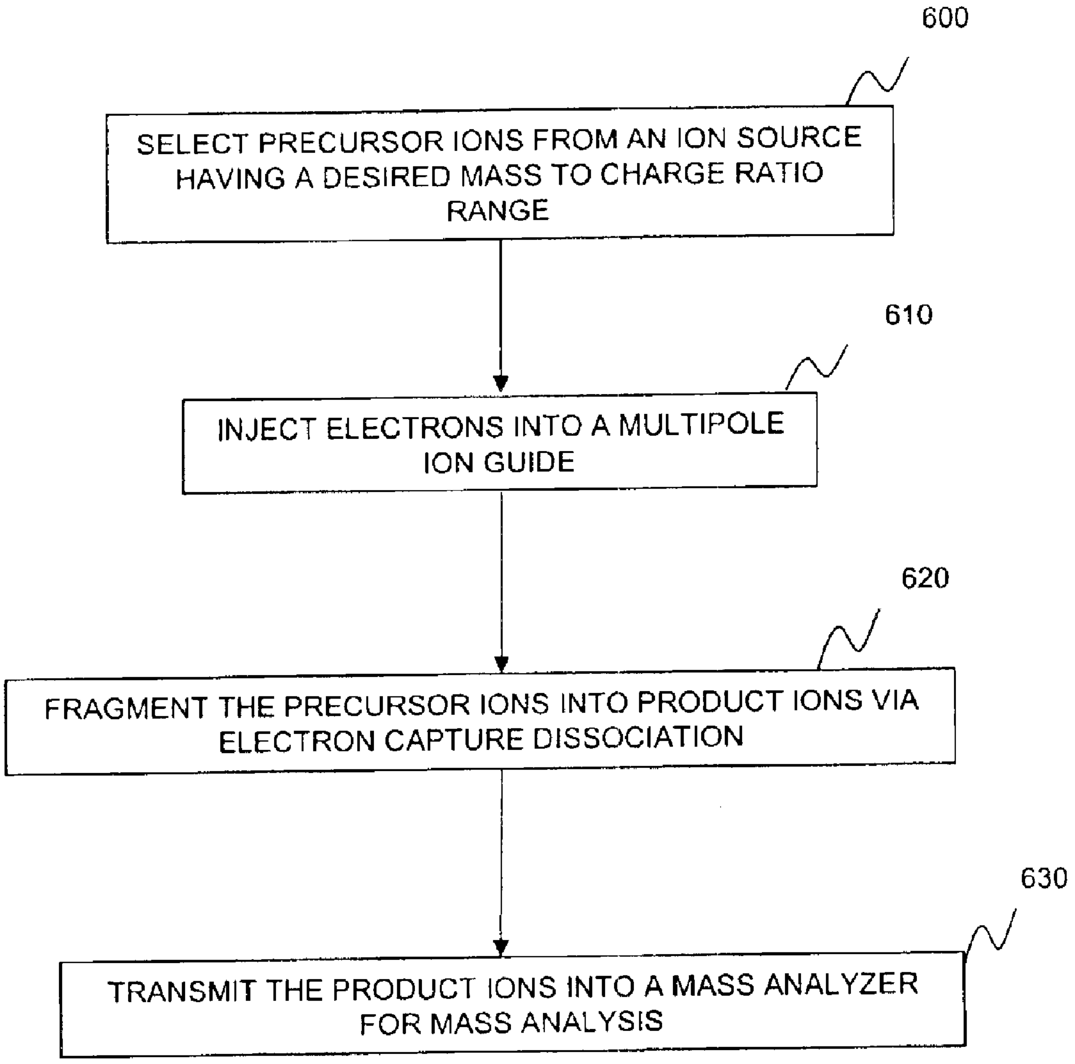
FIG. 6 is a flowchart depicting a preferred method of the present invention.

Thus, the present invention in general provides a system and a method for performing the general process steps depicted in FIG. 6. FIG. 6 is a flowchart depicting a preferred method of the present invention. At step 600, precursor ions from an ion source are selected within a desired mass to charge ratio range. At step 610, electrons are injected into a multipole ion guide. At step 620, using the electrons injected inside the multipole ion guide, precursor ions are fragmented into product ions via electron capture dissociation. At step 630, the product ions and optionally any remaining precursor ions are transmitted into a mass analyzer for mass analysis.

In step 600, the ions can be selected by transmitting the ions into a quadrupole mass selector and/or an ion trap mass selector. Prior to the ions being selected, the ions are generated by any number of well known ion production techniques such as for example the above-discussed electrospray ionization and chemical exchange techniques. As shown in FIG. 1, ions once generated are collected at an entrance of a mass spectrometer inside of which the above-noted mass quadrupole spectrometer or ion trap can be used to select from the ion source those precursor ions of a desired mass to charge ratio range.

In step 610, the electron beam can be injected through a gap between electrodes of separate multipole ion guides, through a slit in an electrode of the multipole ion guide, and/or through electrodes of the multipole ion guide. The electrodes of the multipole ion guide can be round rods, hyperbolically shaped rods, and/or rectangular rods. An electron beam can be injected, and the electron beam controlled to a given electron beam current and duration of the electron beam. The measuring and control of the electron beam current and duration using any of the techniques known in the art for electron beam production and control. Accordingly, the injected electrons can be injected at an electric DC potential which is a few tenths of 1 V and/or a few volts lower than a potential at a central axis of the multipole ion guide. The electrons, in one preferred embodiment of the present invention, can be injected into a space between two adjacent multipole ion guides.

In step 620, ions are fragmented by electron capture dissociation. As noted previously, low energy electron capture dissociation or "hot" energy electron capture dissociation can be practiced to enhance molecular fragmentation. As such, precursor ions are interacted with electrons having either an energy close to 0 eV (i.e. low energy electron capture dissociation) or an energy sufficient to produce electronic excitation of the precursor ions prior to electron capture dissociation (i.e. hot energy electron capture dissociation). In one preferred embodiment of the present invention, the precursor ions are biomolecules, and the fragmentation of the biomolecules in the multipole ion guide of the present invention by electron capture dissociation facilitates identification of the biomolecular species.

Further, to facilitate fragmentation, the precursor ions and any remaining parent ions can be trapped to increase the probability of electron capture dissociation. In addition, a buffer gas can be added to provide collisional focusing. In step 620, fragmentation can be enhanced by capturing the electrons injected from the multipole ion guide in a space between two adjacent multipole ion guides. Further, the multipole ion guide can be provided with a radio frequency sine waveform and/or a square waveform having zero-voltage windows to increase electron capture. The square waveform having zero-voltage windows provides in the multipole ion guide larger time periods, as compared to the sine waveforms, in which the electric field potential is close to zero, thus increasing electron capture and dissociation.

Further, use of a square waveform having zero voltage windows permits electrons to be injected obliquely, such as for example at 45° angles such as shown in FIG. 4A along the broken line depicted thereon, into a region inside the multipole ion guide for electron capture dissociation.

In step 630, the product ions and any remaining precursor ions can be transmitted into at least one of a co-axial time-of-flight mass spectrometer, an orthogonal time-of-flight mass spectrometer, a quadrupole mass spectrometer, an ion trap mass spectrometer, a magnetic sector mass spectrometer and a Fourier transform mass spectrometer. Trapped ions in a linear ion guide (e.g., in the at least one multipole ion guide) can be periodically released into the time-of-flight mass analyzer for mass analysis. A release of trapped ions and a start of push-pull pulses in the time-of-flight mass analyzer can be delayed to improve a duty cycle of the time-of-flight mass analyzer.

Numerous modifications and variations of the present invention are possible in light of the above teachings. It is therefore to be understood that within the scope of the appended claims, the invention may be practiced otherwise than as specifically described herein.

What is claimed is:

1. A method for fragmenting ions in a tandem mass spectrometer having at least one multipole ion guide and a mass analyzer, comprising:

selecting from said ions precursor ions within a desired mass to charge ratio range;

injecting electrons into said at least one multipole ion guide;

fragmenting the precursor ions into product ions via electron capture dissociation from injected electrons; and transmitting at least the product ions into a mass analyzer for mass analysis.

2. The method of claim 1, wherein said selecting comprises:

passing said ions through a mass selector to select said precursor ions having said desired mass to charge ratio range.

3. The method of claim 2, wherein said passing comprises:

passing said ions through at least one of a quadrupole mass selector and an ion trap mass selector.

4. The method of claim 1, wherein said transmitting comprises:

transmitting remaining of the precursor ions into said mass analyzer for mass analysis.

5. The method of claim 1, wherein said transmitting comprises:

transmitting said product ions into at least one of a co-axial time-of-flight mass spectrometer, an orthogonal time-of-flight mass spectrometer, a quadrupole mass spectrometer, an ion trap mass spectrometer, a magnetic sector mass spectrometer, and a Fourier transform mass spectrometer.

6. The method of claim 1, wherein said fragmenting the precursor ions comprises:

adding a buffer gas to said multipole ion guide in a region of said electron capture dissociation.

7. The method of claim 1, wherein said injecting electrons comprises:

injecting an electron beam of said electrons through a gap between electrodes of separate multipole ion guides.

8. The method of claim 1, wherein said injecting electrons comprises:

injecting an electron beam of said electrons through a slit in electrodes of said at least one multipole ion guide.

9. The method of claim 1, wherein said injecting electrons comprises:

injecting said electrons through electrodes of said at least one multipole ion guide, said electrodes comprising at least one of round rods, hyperbolically shaped rods, and rectangular rods.

10. The method of claim 1, wherein said injecting electrons comprises:

injecting an electron beam into said at least one multipole ion guide; and controlling at least one of a current and a duration of the electron beam.

11. The method of claim 1, wherein said injecting electrons comprises:

injecting electrons at an electric DC potential which is a few tenths of a volt lower than a potential at a central axis of the at least one multipole ion guide.

12. The method of claim 1, wherein said injecting electrons comprises:

injecting electrons at an electric DC potential which is a few volts lower than a potential at a central axis of the at least one multipole ion guide.

13. The method of claim 1, further comprising:

trapping at least one of the product ions and remaining of the precursor ions in said at least one multipole ion guide.

14. The method of claim 13, wherein the transmitting comprises:

passing at least one of the product ions and the remaining precursor ions into a time-of-flight mass analyzer.

15. The method of claim 14, wherein the passing comprises:

periodically releasing trapped ions into the time-of-flight mass analyzer for mass analysis;

providing a delay between a release of trapped ions and a start of push-pull pulses in the time-of-flight mass analyzer; and adjusting the delay to improve a duty cycle of the time-of-flight mass analyzer.

16. The method of claim 1, wherein said fragmenting the precursor ions comprises:

providing said at least one multipole ion guide with a radio frequency sinusoidal waveform.

17. The method of claim 1, wherein said fragmenting the precursor ions comprises:

providing said at least one multipole ion guide with a square waveform having zero-voltage windows.

18. The method of claim 17, wherein said injecting comprises:

injecting an electron beam of said electrons between electrodes of said at least one multipole ion guide into a region of said electron capture dissociation.

19. The method of claim 1, wherein said injecting comprises injecting electrons having an energy close to 0 eV, and said fragmenting comprises interacting said precursor ions with said electrons having an energy close to 0 eV.

20. The method of claim 1, wherein said injecting comprises injecting electrons having an energy sufficient to produce electronic excitation of said precursor ions, and said fragmenting comprises interacting said precursor ions with said electrons having said energy sufficient to produce electronic excitation of said precursor ions.

21. The method of claim 1, wherein said fragmenting the precursor ions comprises:

fragmenting at least one of inorganic molecules and biomolecules.

22. A system for mass analysis comprising:

a mass selector configured to select from an ion source precursor ions within a desired range of mass to charge ratios;

at least one multipole ion guide connected in tandem with said mass selector;

an electron injector configured to inject electrons into said at least one multipole ion guide such that the precursor ions are fragmented into product ions via electron capture dissociation;

a mass analyzer connected in tandem with said at least one multipole ion guide and configured to mass analyze at least the product ions.

23. The system of claim 22, wherein the mass selector comprises at least one of a quadrupole mass selector and an ion trap mass selector.

24. The system of claim 22, wherein the mass analyzer comprises at least one of a coaxial time-of-flight mass spectrometer, an orthogonal time-of-flight mass spectrometer, a quadrupole mass spectrometer, an ion trap mass spectrometer, a magnetic sector mass spectrometer, and a Fourier transform mass spectrometer.

25. The system of claim 22, wherein the at least one multipole ion guide includes a gas introduction port configured to add a buffer gas in a region of said electron capture dissociation.

26. The system of claim 22, wherein the at least one multipole comprises:

separate electrodes having a gap therebetween.

27. The system of claim 22, wherein the at least one multipole comprises:

at least one electrode having a slit.

28. The system of claim 22, wherein said electron injector is positioned to inject said electrons between electrodes of said at least one multipole ion guide.

29. The system of claim 22, wherein said at least one multipole ion guide comprises at least one of a set of round rods, a set of hyperbolically shaped rods, and a set of rectangular rods.

30. The system of claim 22, wherein said electron injector is configured to inject said electrons at an electric DC potential which is a few tenths of a volt lower than a potential at a central axis of the at least one multipole ion guide.

31. The system of claim 22, wherein said electron injector is configured to inject said electrons at an electric DC potential which is a few volts lower than a potential at a central axis of the at least one multipole ion guide.

32. The system of claim 22, wherein said at least one multipole ion guide is configured to trap at least one of the product ions and remaining of the precursor ions.

33. The system of claim 32, wherein said mass analyzer is a time-of-flight mass analyzer, trapped ions in said at least one multipole ion guide are periodically released into the time-of-flight mass analyzer for mass analysis; and a delay is provided between a release of trapped ions and a start of push-pull pulses in the time-of-flight mass analyzer, said delay being adjusted to improve a duty cycle of the time-of-flight mass analyzer.

34. The system of claim 22, wherein said electron injector is configured to inject electrons having an energy close to 0 eV.

35. The system of claim 22, wherein said electron injector is configured to inject electrons having an energy sufficient to produce electronic excitation of said precursor ions.

36. A method of fragmenting ions inside at least one multipole ion guide, comprising:

directing said ions from an ion source into the at least one multipole ion guide;

injecting electrons into said at least one multipole ion guide; and fragmenting said ions into product ions via electron capture dissociation from injected electrons.

37. The method of claim 36, wherein said directing comprises:

passing said ions through a mass selector to select precursor ions having said desired mass to charge ratio range.

38. The method of claim 37, wherein said passing comprises:

passing said ions through at least one of a quadrupole mass selector and an ion trap mass selector.

39. The method of claim 36, wherein said fragmenting comprises:

adding a buffer gas to said at least one multipole ion guide in a region of said electron capture dissociation.

40. The method of claim 36, wherein said injecting electrons comprises:

injecting an electron beam of said electrons through a gap between electrodes of separate multipole ion guides.

41. The method of claim 36, wherein said injecting electrons comprises:

injecting an electron beam of said electrons through a slit in one electrode of said at least one multipole ion guide.

42. The method of claim 36, wherein said injecting electrons comprises:

injecting electrons through electrodes of said at least one multipole ion guide, said electrodes comprising at least one of a round rod, a hyperbolically shaped rod, and a rectangular rod.

43. The method of claim 36, wherein said injecting electrons comprises:

injecting an electron beam of said electrons into said at least one multipole ion guide; and controlling at least one of a current and a duration of the electron beam.

44. The method of claim 36, wherein said injecting electrons comprises:

injecting electrons at an electric DC potential which is a few tenths of a volt lower than a potential at a central axis of the multipole ion guide.

45. The method of claim 36, wherein said injecting electrons comprises:

injecting electrons at an electric DC potential which is a few volts lower than a potential at a central axis of the multipole ion guide.

46. The method of claim 36, wherein said directing comprises:

trapping at least one of said product ions and remaining undissociated ions in the multipole ion guide.

47. The method of claim 46, further comprising:

passing at least one of the product ions and the remaining undissociated ions into a time-of-flight mass analyzer.

48. The method of claim 47, wherein the passing comprises:

periodically releasing trapped ions into the time-of-flight mass analyzer for mass analysis; and delaying the delay a release of trapped ions and a start of push-pull pulses in the time-of-flight mass analyzer, said delaying improving a duty cycle of the time-of-flight mass analyzer.

49. The method of claim 36, further comprising:

providing said multiple ion guide with a radio frequency sinusoidal waveform.

50. The method of claim 36, further comprising:

providing said multiple ion guide with a square waveform having zero-voltage windows.

51. The method of claim 50, wherein said injecting electron comprises:

injecting an electron beam of said electrons between electrodes of said at least one multipole ion guide into a region of said electron capture dissociation.

52. The method of claim 36, wherein said injecting comprises injecting electrons having an energy close to 0 eV into said multipole ion guide, and said fragmenting comprises interacting said ions with said electrons having an energy close to 0 eV.

53. The method of claim 36, wherein said injecting comprises injecting electrons having an energy sufficient to produce electronic excitation of said ions, and said fragmenting comprises interacting said ions with said electrons having an energy sufficient to produce electronic excitation of said ions.

54. The method of claim 36 wherein said fragmenting comprises:

fragmenting at least one of inorganic molecules and biomolecules.

* * * * *